2,955,067

CELLULOSIC PAPER CONTAINING ION EXCHANGE RESIN AND PROCESS OF MAKING THE SAME

Charles H. McBurney, Huntingdon Valley, and Erich F. Meitzner, Glenside, Pa., assignors to Rohm & Haas Company, Philadelphia, Pa., a corporation of Delaware No Drawing. Filed Oct. 20, 1954, Ser. No. 463,624

6 Claims. (Cl. 162—164)

This invention relates to paper products which are capable of adsorbing ions from fluids. It relates to paper products which contain finely divided and substantially uniformly distributed discrete particles of ion-exchange resins and which are capable of adsorbing ions from liquids and gases.

An object of this invention is to produce paper, paperboard, molded pulp products and the like which contain particles of ion-exchange resins and which consequently have ion-exchange properties.

The products of this invention, by virtue of containing discrete particles of ion-exchange resins, have many uses. They can be employed to adsorb ions under conditions where the use of the conventional ion-exchange resins in the form of granules or spheroids is not feasible. Thus, they may be used in oil filters to remove contaminants—particularly acidic impurities—from lubricating oils. Or they can be used in filter tips of cigarettes or in the filter cartridges of smoking pipes to remove irritants and nicotine from the smoke. They serve as wrappers for materials, such as metal objects, which are subject to tarnishing or corrosion in atmospheres containing corrosive gases. They also serve as wrappers for food products where they reduce spoilage by adsorbing compounds causing, or resulting from, decomposition. Because of their ability to adsorb ammonia and other irritants, these paper products are eminently suited for use in the manufacture of paper diapers, diaper linings and catamenial devices. Furthermore, those in which the quantity of ion-exchange resin is high have a substantial degree of perm-selectivity and consequently allow ions of one sign to pass through them freely when they are employed as membranes in electrolytic processes while at the same restraining ions of the opposite sign from passing through, depending on whether the products contain anion-exchange or cation-exchange resins. Since, however, the instant products are by their very nature porous, they are not as efficient in this last use as are other membranes which contain ion-exchange resins but which are impermeable to aqueous solutions.

The products of this invention have the general physical properties, including appearance, porosity and feel of conventional paper products such as crepe, tissue, wrapping and blotting papers, cardboard, chipboard, boxboard, molded or shaped pulp products such as plates, boxes or cartons, and paper containers in general. They are made by dispersing, distributing, or incorporating discrete particles of one or more ion-exchange resins in a pulp or paper-making stock and thereafter forming a sheet from the stock or otherwise molding or shaping the mixture of pulp and resin. The process of this invention is distinguished from other methods of impregnating paper with thermoplastic or thermosetting resins—such as dipping a paper in a solution of a resin—in that the resins employed herein are ion-exchange resins in the form of fine discrete particles which are insoluble in aqueous media and in practically all organic liquids. The products of this invention are, therefore, materials which contain innumerable discrete particles of insoluble resin distributed throughout—and held in place by—the fibers of pulp. Since finer particles of the resins are more easily distributed throughout the paper-making stock or pulp and are more efficiently retained, it is recommended that the particles of the resins be at least fine enough to pass through a U.S. Standard sieve No. 50—or preferably through a U.S. Standard sieve No. 100. Actually best results are obtained by employing micropulverized resins.

The pulverized resins are added to the pulp or paper-making stock and are intimately dispersed therein before the pulp or stock is laid down as a sheet or is otherwise molded. That is to say, the resin particles are used as wet-end additives and they are mixed with the paper-mixing stock while the latter is still dispersed in water. This is known as "beater addition" and, depending upon the particular type of paper-making machine, addition can be made in the beater, jordan, stuff box, head box, or other pulp-refining devices. What is essential is that the particles of resin be thoroughly distributed throughout the pulp while the latter is suspended in an aqueous medium. In one embodiment of this invention, the resin is mixed with the pulp or paper-making stock in the beater, preferably at some stage before the pulp has been beaten to its ultimate degree of freeness; and beating is then continued while the particles are intimately distributed. A convenient practice is to add the pulverized resin as a slurry in water. What is required is that the particles be distributed as uniformly as possible throughout the pulp; and for this purpose, conventional methods of stirring, mixing or beating can be employed.

When viewed under a microscope, the individual pulp fibers and the discrete particles of ion-exchange resins are visible; and it appears that the particles of resin are held in place by the longer, intermeshed fibers.

The ease of dispersion of the particles of resin by the pulp depends not only on the size of the particles, but on the degree of refinement of the pulp also. For example, varying amounts of the same batch of pulverized resin were added to an unbleached kraft pulp which had been lightly beaten to a Canadian freeness of 685 ml. The amounts of resin which were added varied from 100% to 300% based on the weight of the dry pulp. When hand sheets were made from these paper-stocks, it was found that in each case 50% to 55% of the resin was retained and found in the sheets. Thus, the sheets contained approximately from 50% to 165% of solid resin particles based on the weight of the dry pulp in the sheets. When, however, the same pulp was beaten to a Canadian freeness of 435 ml., and the test was repeated, it was found that about 70% to 75% of the resin was retained. This last series of tests gave rise, therefore, to papers containing from about 70% resin to about 225% resin, based on the weight of the dry pulp.

After the particles of resin are dispersed or distributed substantially uniformly throughout the pulp or paper furnish or paper-making stock, the mass is laid down or molded or shaped by conventional means. While some of the resin particles may remain together with some of the fibers of pulp in the white water, the retention of the particles of resin in the pulp is surprisingly high. Furthermore, the white water containing the resin particles can be recirculated and re-used.

The amount of resin which is incorporated in the paper products of this invention can be varied widely depending on the size of the particles of resin, the basis weight of the paper, the degree of the refinement of pulp, and on the use to which the product is to be put. It is, however, recommended that the paper products contain at least about 10% ion-exchange by weight based on the weight of the dry pulp so that the product has a significant capacity for adsorbing or exchanging ions. It is much preferred that a greater amount—above 20%—of ion-exchange resin be present so that the ion-adsorbing capacity be as high as possible, especially in those cases where the paper products are required to be used a long time, as in the case of wrappers, and cannot be regenerated. Papers have been made containing as much as 300% dry resin based on the weight of dry pulp. These had high capacity for adsorbing ions from liquids and gases. High ratios of resin particles to pulp make for weaker paper products, so that the particular ratio which is employed is a matter of choice and depends on the physical properties and the ion-adsorbing properties required in a particular application.

The paper furnishes to which the ion-exchange resins are added may contain, in addition to the pulp, other modifying materials such as the conventional sizing agents, alum, loaders or fillers, or dyes and pigments if desired. Furthermore, other resins which are customarily used for imparting wet strength, such as the urea-aldehyde and melamine-aldehyde resins, can be employed in conjunction with the ion-exchange resins.

Since this invention relates to paper products in general which contain discrete particles of ion-exchange resins, any kind of pulp can be employed such as alpha cellulose, rag pulp, kraft pulp, ground-wood and soda, sulfite and sulfate pulps. The pulps can be bleached or unbleached.

The ion-exchange resins which are employed in the form of fine particles can be anion-exchange or cation-exchange resins or mixtures of the two types. The anion-exchange resins can be those of the well-recognized weakly basic type wherein the functional, anion-adsorbing groups are primary, secondary or tertiary amino groups attached to insoluble cross-linked resinous nuclei. Or they may be the equally well-known anion-exchange resins of the strongly basic type containing, as their functional groups, quaternary ammonium groups and typified by copolymers of styrene and divinylbenzene to the aromatic nuclei of which are joined quaternary ammonium groups by means of methylene groups. Either weakly acidic or strongly acidic cation-exchange resins can likewise be used. The weakly basic types are those in which the functional groups are carboxylate groups and which are exemplified by the cross-linked, insoluble copolymers of acrylic acid or methacrylic acid and divinylbenzene. Strongly acidic cation-exchange resins are those in which the functional cation-exchanging groups are sulfonate groups; and the most popular of such resins is a sulfonated copolymer of styrene and divinylbenzene. All of these four kinds of resins are available commercially. Suitable anion-exchange resins are those described in U.S. Patents 2,106,486; 2,151,883; 2,223,930; 2,251,234; 2,259,169; 2,285,750; 2,341,907; 2,354,671; 2,354,672; 2,356,141; 2,366,008; 2,388,235; 2,402,384; 2,591,573; 2,591,574; and 2,675,-359. U.S. Patents 2,184,943; 2,195,196; 2,204,539; 2,228,159; 2,228,160; 2,230,641; 2,259,455; 2,285,750; 2,319,359; 2,366,007; 2,340,110; and 2,340,111 describe suitable cation-exchange resins. Mixtures of resins, including mixtures of at least one anion-exchange resin in the hydroxyl form and at least one cation-exchange resin in the hydrogen form, can be incorporated in the paper products. Papers containing such mixtures of the two kinds of resins are particularly advantageous because they adsorb both anions and cations and can be used very conveniently for making deionized water which is necessary for steam irons and electric storage batteries for example.

When the resins in the paper products of this invention have adsorbed their capacity of ions, they can be regenerated by the regenerants which are commonly used for regeneration of the same resins when they are used alone in ion-exchanging operations, such as in water-conditioning.

The following examples illustrate the process and products of this invention:

EXAMPLES

Hand sheets, containing varying amounts and kinds of ion-exchange resins, were made by the standard T.A.P.P.I. (Technical Association of the Pulp and Paper Industry) process, T218m–48. Thus, a slurry of a pulp at a concentration of 2.5% was beaten to the desired freeness, as measured, for example, by the standard T.A.P.P.I. procedure, T460m–49. This was then diluted to a pulp concentration of 1% and particles of ion-exchange resins, all of which were so fine as to pass through a U.S. Standard sieve No. 100, were then added as a 10% slurry in water. In some cases alum or sulfuric acid was added to impart a lower pH. Also in some cases a typical urea-formaldehyde resin was added in order to impart enhanced wet-strength. Sheets were then laid down from the furnish at a pulp concentration of 0.04%. The sheets were dried on a drum drier for two minutes at 200° F. and finally conditioned for 24 hours at 75° F. and 65% relative humidity.

Example I

A paper was thus prepared from a mixture of unbleached kraft pulp, beaten to a Canadian freeness of 485 ml. and a pulverized anion-exchange resin which had been made by the aminolysis, with diethylenetriamine, of an insoluble copolymer of about 95% ethyl acrylate and about 5% divinylbenzene. The paper contained approximately 30% resin by weight, based on the weight of dry pulp. This had a dry-strength of 34 lbs./inch and a wet-strength of 2.8 lbs./inch. Its densometer value, which is a measure of porosity, was 13 seconds. (A "densometer value" is a measure in seconds required to displace 100 ml. of air through one square inch of area of a paper. Lower values indicate higher porosity; and the procedure of determining the values is the standard A.S.T.M. test, D–726.) This paper, which had the general appearance and feel of wrapping paper, also had an anion-adsorbing capacity for HCl of 1.78 milliequivalents per gram of dry paper. The paper also removed stearic acid from a dilute solution of stearic acid in benzene when it was immersed in and was shaken with such a solution.

By way of comparison, a paper was made in an identical manner except that the anion-exchange resin was omitted. That paper had a dry-strength of 34 lbs./inch, a wet-strength of 0.8 lb./inch and a densometer value of 33. Of course, it had no ion-adsorbing properties whatever.

Example II

A paper was made by the process of Example I, except that the paper-making stock contained 2% of a commercial wet-strength resin of the urea-formaldehyde type and 3% alum, based on the dry weight of the pulp, in addition to the pulp and anion-exchange resin. The finished product had an anion-exchange capacity of 1.82 milliequivalents per gram (dry), a dry-strength of 29 lbs./inch and a wet-strength of 3.9 lbs./inch, and a densometer value of 8 seconds.

Another paper was made like that described in the preceding paragraph except that it contained approximately 40% of the anion-exchange resin. This product had a dry-strength of 31 lbs./inch, a wet-strength of 3.2 lbs./inch and a densometer value of 8 seconds and a capacity of 2.25 milliequivalents per gram dry.

Example III

A paper containing a cation-exchange resin was prepared by the process of Example I above. The paper contained approximately 25%, based on dry pulp, of a micropulverized, commercially available cation-exchange resin, known to be a copolymer of methacrylic acid and divinylbenzene made by the process of U.S. Patent 2,340,111. This paper had a thickness of 24 mils, dry-strength of 29 lbs./inch, a densometer value of 5 seconds and a cation-adsorbing capacity of 4.11 milliequivalents per gram dry. It had the general appearance and feel of wrapping paper.

*Example IV*

In this instance the paper, prepared by the procedure of Example I, contained approximately 20% of a micropulverized commercially available, strongly acidic cation-exchange resin, known to be a sulfonated copolymer of styrene and divinylbenzene made according to the process of U.S. Patent 2,366,007. It had a dry-strength of 29 lbs./inch, a wet-strength of 0.5 lb./inch, a densometer value of 6 seconds, and a cation-exchange capacity of 2.91 milliequivalents per gram dry.

The procedure of the paragraph immediately above was followed with the exception that 2% by weight of a commercially available wet-strength resin of the urea-formaldehyde type and 3% by weight of alum, both based on the weight of dry pulp, were used in conjunction with the cation-exchange resin. The finished product had a dry-strength of 33 lbs./inch, a wet-strength of 6.1 lbs./inch, a densometer value of 4 and a cation-exchange capacity of 2.21 milliequivalents/gram dry.

*Example V*

Again, the procedure of Example I was followed in the production of a paper containing a strongly basic anion-exchange resin. The final product contained approximately 35%, based on the weight of dry pulp, of a micropulverized, commercially available, quaternary ammonium type of anion-exchange resin known to have been made by the reaction of trimethylamine with a chloromethylated copolymer of styrene and divinylbenzene by the method of U.S. Patent 2,591,573. The final product had a dry-strength of 24 lbs./inch, a wet-strength of 0.7 lb./inch, a densometer value of 2 seconds, and an anion-exchange capacity of 0.82 milliequivalent/gram dry.

*Example VI*

In a similar manner especially porous papers were made from bleached sulfite pulp beaten to a Canadian freeness of 620 ml. and the same micropulverized weakly basic anion-exchange resin which was employed in Example I. The sheet containing 100% dry resin based on the weight of the dry pulp had the same dry-strength (9.3 lbs./inch) and densometer value (0.8 second) as a paper prepared from untreated pulp which contained no ion-exchange resin. When a sheet of double weight was made from the same mixture of pulp and resin, it was found to have a dry-strength of 15.9 lbs./inch and a densometer value of 2.1 seconds. All of the sheets had the same general appearance and feel; but only the papers containing the particles of resins had acid-adsorbing properties.

Paper products containing ion-exchange resins may be parchmentized and thereby strengthened and rendered grease-proof.

We claim:

1. A process for making cellulosic paper stock having significant ion-exchange properties, which process maximizes the retentivity of the ion-exchange materials introduced to the cellulosic pulp from which the paper is made, said process comprising beating the cellulosic pulp to a minimum Canadian freeness of approximately 685 ml., adding to the pulp discrete pulverized particles of a fully cured and water-insoluble ion-exchange resin, said particles being fine enough to pass through a U.S. Standard sieve No. 50 and being added in any desired amount from 10% to 300%, based on the weight of the dry pulp, laying down sheets from the paper furnish, and then drying the sheets to form the paper stock.

2. The process of claim 1 except that the Canadian freeness is on the order of 620 ml.

3. The process of claim 1 except that the Canadian freeness is on the order of 435 ml.

4. A process for making cellulosic paper having significant ion-exchange properties which comprises beating a slurry of cellulosic paper pulp at a concentration of 2.5% to a minimum Canadian freeness of approximately 685 ml., diluting the slurry to a pulp concentration of approximately 1%, adding to the slurry from 10% to 300%, based on the weight of the dry pulp, of discrete pulverized particles of a fully cured and water-insoluble ion-exchange resin as a 10% slurry in water, said resin particles being fine enough to pass through a U.S. Standard sieve No. 50, laying down sheets from the paper furnish at a pulp concentration of approximately 0.04%, and then drying the sheets.

5. A process for making cellulosic paper having significant ion-exchange properties, which process maximizes the retentivity of the ion-exchange materials introduced to the cellulosic pulp from which the paper is made, said process comprising beating a slurry of the cellulosic pulp to a minimum Canadian freeness of approximately 685 ml., diluting the slurry with water, adding to the diluted slurry an aqueous dispersion of pulverized, fully cured and water-insoluble ion-exchange resin particles fine enough to pass through a U.S. Standard sieve No. 50, said resin particles being added in any desired amount from 10% to 300% based on the weight of the dry pulp, and thereafter forming the paper stock from the slurry of pulp and resin.

6. A cellulosic paper product having significant ion-exchange properties by virtue of the fact that it contains approximately 10 to 225%, based on the weight of the dry pulp, of preformed discrete pulverized particles of an ion-exchange resin which was in a fully cured and insoluble condition prior to its use in said paper product, the said particles being fine enough to pass through a U.S. Standard sieve No. 50 and being physically held in place by the fibers of the pulp from which the paper product was made.

References Cited in the file of this patent

UNITED STATES PATENTS

| | | |
|---|---|---|
| 1,160,362 | Baekeland | Nov. 16, 1915 |
| 2,137,155 | Burmeister | Nov. 15, 1938 |
| 2,278,291 | Swan | Mar. 31, 1942 |
| 2,407,599 | Auten et al. | Sept. 10, 1946 |
| 2,512,720 | Keim | June 27, 1950 |
| 2,538,926 | Sutherland | Jan. 23, 1951 |
| 2,581,186 | Green | Jan. 1, 1952 |
| 2,684,321 | Thurmon et al. | July 20, 1954 |
| 2,692,867 | Passing | Oct. 26, 1954 |
| 2,798,850 | Voightman et al. | July 9, 1957 |

FOREIGN PATENTS

| | | |
|---|---|---|
| 467,505 | Canada | Aug. 22, 1950 |
| 693,166 | Great Britain | June 24, 1953 |

OTHER REFERENCES

T.A.P.P.I., vol. 34, No. 3, March 1951, pp. 108–110.